United States Patent [19]

Fujiki et al.

[11] 4,053,026
[45] Oct. 11, 1977

[54] LOGIC CIRCUIT FOR AN AUTOMATIC BRAKING SYSTEM FOR A MOTOR VEHICLE

[75] Inventors: Norio Fujiki, Yokohama; Hiroshi Endo, Yokosuka, both of Japan

[73] Assignee: Nissan Motor Co., Ltd., Yokohama, Japan

[21] Appl. No.: 748,701

[22] Filed: Dec. 8, 1976

[30] Foreign Application Priority Data

Dec. 9, 1975 Japan .................................. 50-147248

[51] Int. Cl.² .......................... B60T 7/00; G01S 9/02
[52] U.S. Cl. ........................................ 180/98; 340/53; 343/7 VM
[58] Field of Search ................. 303/91, 93; 180/98; 343/112 CA, 7 VM, 7 VC; 340/52 H, 53, 258 R, 258 D

[56] References Cited

U.S. PATENT DOCUMENTS

| 3,442,347 | 5/1969 | Hodgson | 340/258 R |
| 3,448,822 | 6/1969 | La Lone | 343/7 VM |

*Primary Examiner*—Trygve M. Blix
*Assistant Examiner*—Reinhard J. Eisenzopf
*Attorney, Agent, or Firm*—Bacon & Thomas

[57] ABSTRACT

Braking of a vehicle is prolonged by an improved logic circuit for a time or a distance to overcome stop starting braking due to momentary "safe" signals caused by multiple reflection of a radar signal.

5 Claims, 9 Drawing Figures

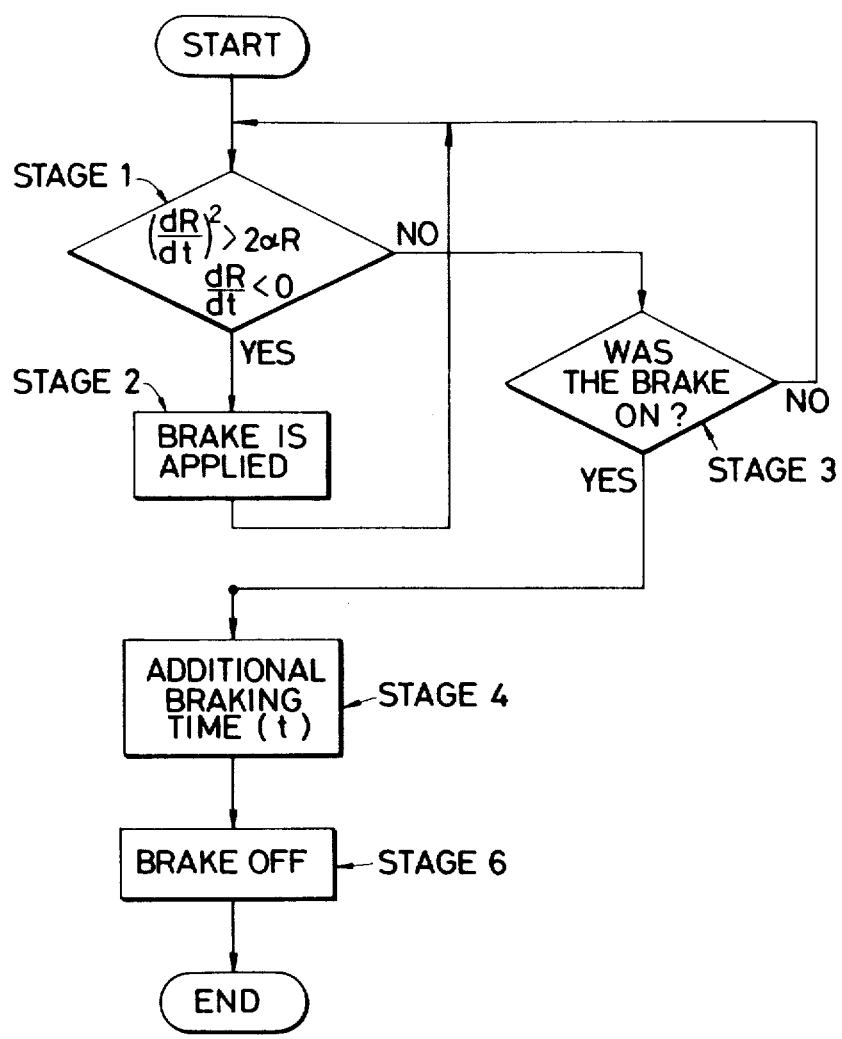

LOGIC CIRCUIT FOR AN AUTOMATIC BRAKING SYSTEM FOR A MOTOR VEHICLE

This invention relates to an automatic safety braking system for a motor vehicle and more particularly to an improved logic circuit for same.

The use of automatic and semi automatic braking systems for motor vehicles is now under serious consideration and consequently there are a large number, but almost invariably they employ some kind of radar as the sensor for same.

As is well known a vehicle equipped with a radar type automatic braking system traversing a road emits a radar signal in order to detect obstacles (moving or otherwise) ahead of the vehicle. Ideally should the radar beam or signal strike an obstacle it is reflected and received by the antenna mounted at the front of the vehicle. The received signal is then processed by a logic circuit to determine the possibility of a collision. Should the logic circuit product a signal indicating a collision is imminent the vehicle brakes are applied and or a vehicle driver alerting system is activated. The vehicle is thus brought to a halt or decelerated to a speed which matches that of the obstacle.

However one major problem plaguing these braking systems is the wide fluctuation in the strength of the reflected and received signal; some of the reasons for which will now be explained with reference to FIG. 1.

FIG. 1 shows a motor vehicle 7 equipped with a radar type braking system. A radar beam 9 is emitted from the front of the vehicle. The beam 9 is, at position B relatively wide, but at position A, rather narrow. Thus an object 8 located (as shown) between positions A and B and at the edge of the beam 9 may momentarily move out of the beam due to yawing and/or nose diving of the vehicle brought about by varying road conditions. As a result the reflected signal may suddenly disappear and cause the logic circuitry to generate a "safe" signal even though a collision is imminent.

Another cause of a great decrease in the signal strength is multiple reflection of the signal on its way back to the vehicle, e.g. the beam may be multiply reflected due to the orientation of the object reflecting the signal. The object (which is for example a motor vehicle) may be proceeding up an incline or traversing a corner and subsequently cause the signal to reflect down onto the road to be in turn reflected to the antenna and/or cause the signal to reflect from roadside trees or buildings, thereby causing the signal to be extremely weak on reception and cause the radar to momentarily produce a dangerously false "safe" signal.

It is therefore an object of the invention to provide a logic circuit for an automatic braking system utilizing radar which activates the braking system of a vehicle and maintains the braking system in such a state for either a predetermined time or distance after a "danger" signal disappears.

It is also an object of the invention to provide a logic circuit which provides smooth braking of the motor vehicle despite sudden and or repeated losses of the danger signal.

The invention will become better understood as the description proceeds, taken in conjunction with drawings in which;

FIG. 8 is a flow chart showing the underlying logic which characterizes the invention.

Figure 1:
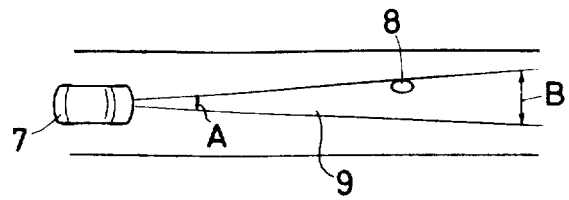
FIG. 1 is a diagram showing a vehicle equipped with an automatic braking system traversing a road and encountering an object in its path.
Figure 2:
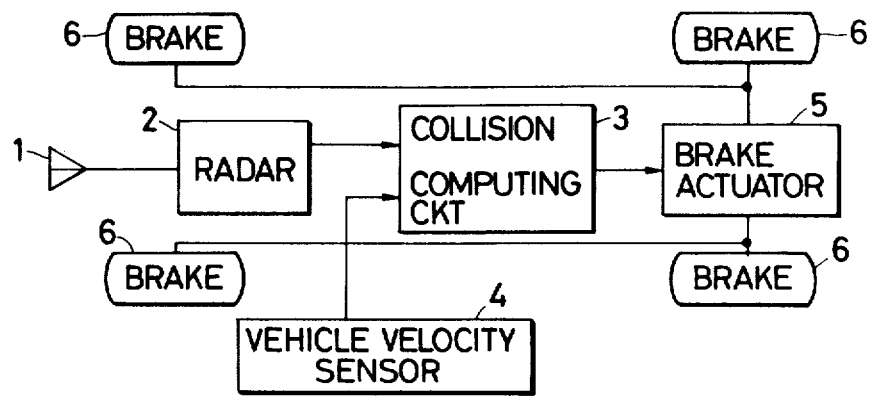
FIG. 2 is a block diagram of a prior art automatic braking system.

In FIG. 2 of the drawings a prior art automatic braking system is shown in block form wherein the numeral 1 denotes a radar antenna operatively connected to a radar or radar circuit 2. A collision imminence computing circuit 3 is fed with information signals from the radar 2 and a vehicle velocity sensor 4 with which it determines if a collision is imminent. If a collision is sensed to be imminent a signal is generated and fed to the brake actuator 5 which in turn applies the brakes 6 to decelerate the vehicle.

Figure 3A:
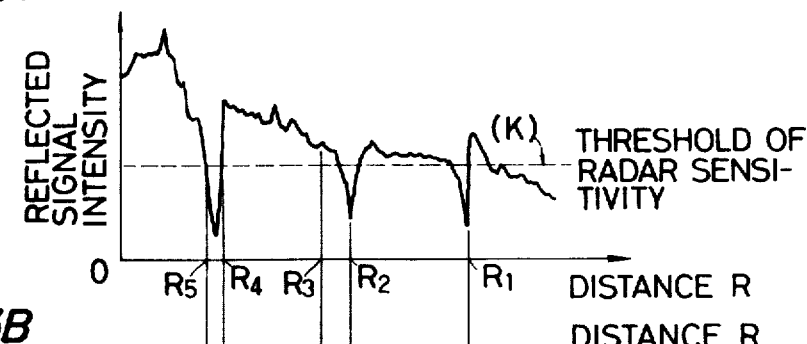
FIG. 3A is a graph showing the fluctuation of the intensity of the reflected signal wherein the intensity of the reflected signal is plotted against the distance between the vehicle and the object reflecting the signal.
Figure 3B:
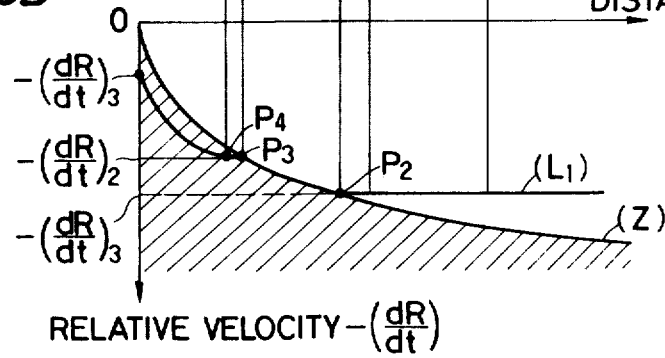
FIG. 3B is a graph showing a curve wherein the relative velocity of the vehicle with respect to the object is plotted against the distance between the vehicle and the object, which denotes the distance from the object for a given velocity at which braking must be initiated in order to reduce the relative velocity therebetween to zero.

FIG. 3A shows a typical signal are received by the antenna mounted at the front of the car wherein the line k denotes the lower limit or threshold of the radar sensitivity. As shown the curve from time to time falls below the line k for reasons set forth previously. In FIG. 3B the line L denotes a vehicle approaching an object at a constant velocity. The relative velocity between the vehicle and the object is denoted by $(dR/dt)_1$. As shown the signal falls off dramatically at distances $R_1$ and $R_2$ but as seen in FIG. 3B the vehicle is not yet within the danger zone. The danger zone is the cross hatched area below the curve Z (FIG. 3B). Thus no problem arises. However at a distance $R_3$ the vehicle has approached the object sufficiently to require deceleration in order to avoid a collision. Thus at point $P_2$ on curve Z braking is initiated. Now at a distance $R_4$ the signal falls to a level which the logic circuit generates a false "safe" signal and releases the brakes. Therefore the vehicle ceases to decelerate and proceeds forward at a constant relative velocity with respect to the object of $(dR/dt)_2$. Shortly thereafter the signal strength increases violently and the logic circuit once again generates a "danger" signal and subsequently reapplies the brakes. However the vehicle has been permitted to approach the object to a point at which maximum decleration or braking cannot reduce the relative velocity between the vehicle and the object to zero. Therefore there is considerable danger of collision at a relative velocity of $(dR/dt)_3$. Furthermore should a series of such false "safe" signals be generated rather violent stop start jolting of the vehicle will occur which may cause the driver sufficient distraction to cause him or her to be in a state as to be unable to take the appropriate action (i.e. steering sounding warning instrument etc.)

Figure 4:
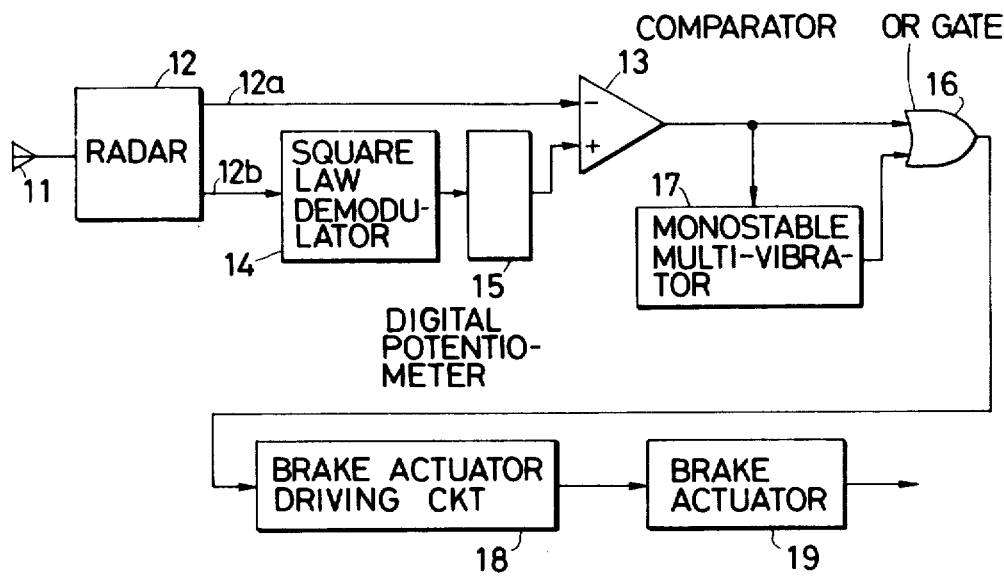
FIG. 4 is a block diagram showing a first preferred embodiment of the invention.

Let us now consider the first embodiment of the invention as shown in block form in FIG. 4.

As is conventional the first embodiment is equipped with a radar antenna 11, operatively connected to a radar or radar circuit 12. Since such circuitry is very well known no description will be given other than it is arranged to emit a first signal representative of R or the distance between the vehicle and the object via a first output and a second signal representative of the relative velocity (dR/dt) of the vehicle and the object. As shown the first signal is fed directly to the first input of a comparator 13. The second signal is fed to a square law demodulator circuit 14 or a circuit which will "square" the magnitude of the signal. The square signal or third signal is then fed to a digital potentiometer 15 or a similar circuit which will increase the magnitude of same by a coefficient (which is either preset or variable with respect to at least one parameter). The digital potentiometer 15 then feeds a fourth signal, i.e. the third signal multiplied by the coefficient, to the second input of the comparator 13. The comparator then compares the first and fourth signals according to the following equations:

$$(\frac{dR}{dt})^2 > 2\alpha R \text{ and } \frac{dR}{dt} < 0$$

where $\alpha$ is the deceleration of the vehicle (M.Sec$^{-2}$) due to the application of the vehicle brakes by the automatic braking system.

Thus from the above it can be seen that the first signal is representative of R the second signal is representative of dR/dt the third signal is representative of (dR/dt)$^2$ the fourth signal is representative of (dR/dt)$^2 \cdot 1/2\alpha$ viz. (dR/dt)$^2 \cdot 1/2\alpha <$ R which may be transformed to (dR/dt)$^2 < 2\alpha$R from the foregoing equations it will be obvious to those skilled in the art that the digital potentiometer or its equivalent may be installed between the first output of the radar and the first input of the comparator 13 to increase the magnitude of the first signal by 2$\alpha$ rather than the second signal by 1/2$\alpha$ as previously described. The circuitry providing the improved characteristics of the invention will now be described.

The comparator compares the signals as previously described. If dR/dt$^2 > 2\alpha$R and dR/dt $< 0$ then a logic "1" appears at the output of the comparator 13. However if either of these equations are not satisfied then a logic 0 appears at the output of the comparator 13. This logic signal is fed to both an OR gate circuit and a monostable multivibrator. If a logic 0 sigal is fed to the OR gate and the monostable multivibrator the OR gate produces a logic 0 at its output. Under these conditions the circuit receiving the signal from the OR gate, or brake actuator driving circuit 18, remains in a passive state and no braking takes place. However, if a logic 1 signal appears on the output terminal of the comparator and is fed to the OR gate and the monostable multivibrator then a logic 1 signal appears on the output of the OR gate and subsequently the brake actuating driving circuit 18 is activated to in turn drive the brake actuator 19 via a drive signal. When the logic 1 disappears and a logic 0 signal is fed to the monostable multivibrator it enters a quasi stable state and remains in that state for a given or pre-selected time. During this quasi stable state a logic 1 signal is fed to the OR gate and accordingly a logic 1 signal is fed to brake driving actuator circuit even though a logic 0 signal is appearing on the output of the comparator 13. Therefore for the period the monostable multivibrator remains in a quasi stable state braking will continue.

Figure 5:
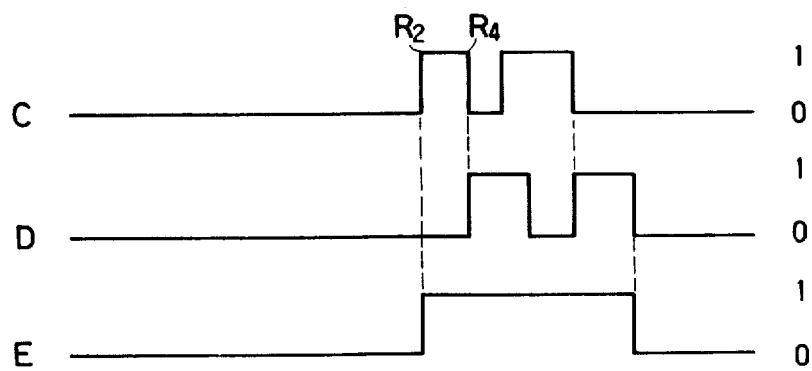
FIG. 5 is a chart showing the logic signals produced in part of the logic circuit of FIG. 4.

Let us now refer to FIG. 5 whereby we can graphically see the wave forms generated by the above described circuitry. The letter C denotes the wave form generated by comparator 13, the letter D the wave form generated by the monostable multivibrator 17 and the letter E the wave form generated by the OR gate 16. Now let's assume that a vehicle equipped with the invention encounters the same conditions as the vehicle in FIG. 3 as seen at a distance R$_3$ from the object the comparator generates a logic 1 signal i.e. the vehicle is about to enter the danger zone. At a distance R$_4$ the erroneous "safe" signal is generated but the monostable multivibrator entering the quasi stable state continues to maintain braking and deceleration of the vehicle. Once again when the "danger" signal reappears braking is maintained by the logic 1 signal from the comparator 13. During this period the monostable multivibrator returns to its non-quasi state. Then as the logic 1 signal from the comparator disappears the trailing edge type monostable multivibrator is once again put into a quasi stable state to once again maintain braking after the comparator once again emits a logic 0 signal. Thus OR gate 16 continuously exhibits a logic 1 signal and the vehicle is braked according to the curve Z shown in FIG. 3B.

It will be understood that the duration of the "quasi" state of the monostable multivibrator is preferably 1 sec. but may be so selected as to provide optimal characteristics and varied with vehicle type if desired.

Figure 6:
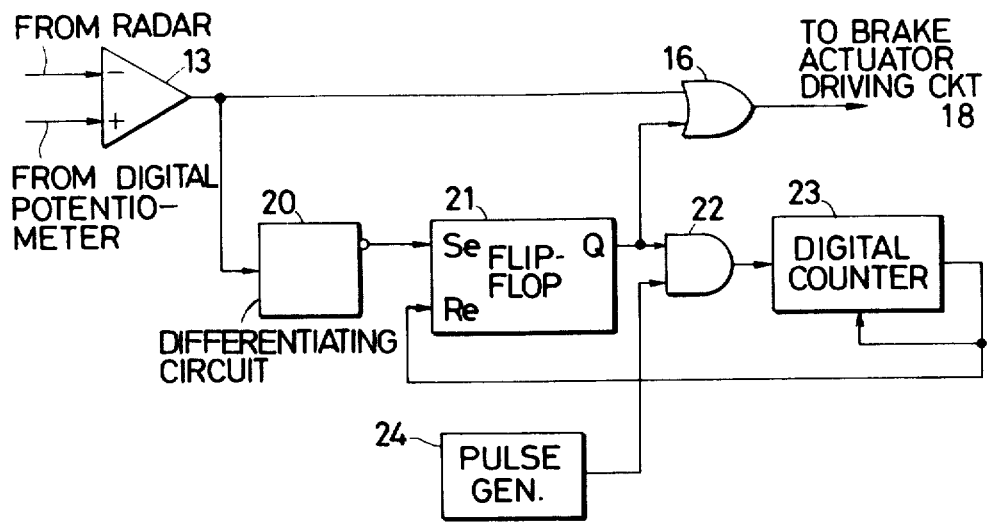
FIG. 6 is a block diagram showing a second preferred embodiment of the invention.

Let us now consider the second embodiment of the invention shown in block form in FIG. 6. In this embodiment it is proposed to maintain the braking and deceleration of the vehicle for a given distance after the danger signal has disappeared in lieu of time as in the last embodiment.

The preliminary circuitry is not shown in this figure but it is as per the first embodiment, however the comparator 13 has its output terminal connected to both an OR gate 16 and a differentiating circuit 20. The function of the differentiating circuit 20 is to set a flip-flop or any other suitable circuit 21 and does so when the logic 1 signal disappears from the output of the comparator 13 and a logic signal appears. The flip-flop is connected to both the OR gate and the AND gate 22. Also connected to the AND gate 22 is a pulse generator 24. The pulse generator is arranged to produce a train of pulses representative of the wheel speed of the vehicle. Connected to the output of the AND gate is a 9 bit digital counter 23. The counter 23 is arranged to generate an impulse after half a cycle. The output of the counter is connected to the reset terminal of the flip-flop 21 to reset same after the counter has counted through half a cycle.

The operation of the above described circuitry is as follows. When the logic 1 signal appears on the output of the comparator 13 a corresponding logic 1 signal appears on the output terminal of the OR gate 16 to initiate braking of the vehicle. When the logic 1 signal subsequently disappears and the logic 0 appears the differential circuit sets the flip-flop. The logic 1 signal appearing on the output Q of the flip-flop opens the AND gate 22 to permit the train of pulses to initiate or trigger the operation of the digital counter 23. Thus a logic 1 signal appears on the outputs of the flip-flop 21 and the OR gate 16 until the counter has counted through half a cycle, at which time an impulse or reset signal from the counter 23 resets the flip-flop to cause a logic 0 signal to appear on its output. Therefore until the counter resets the flip-flop braking of the vehicle is maintained. The time taken for the counter to count through half a cycle determines the additional braking time. However the time taken by the counter is directly proportional to rate at which the counter counts which is determined by the wheel speed of the vehicle. Hence after a predetermined distance the additional braking is stopped. It will be noted that combination of the AND gate, digital counter and pulse generator can be considered as a timing circuit.

Figure 7:
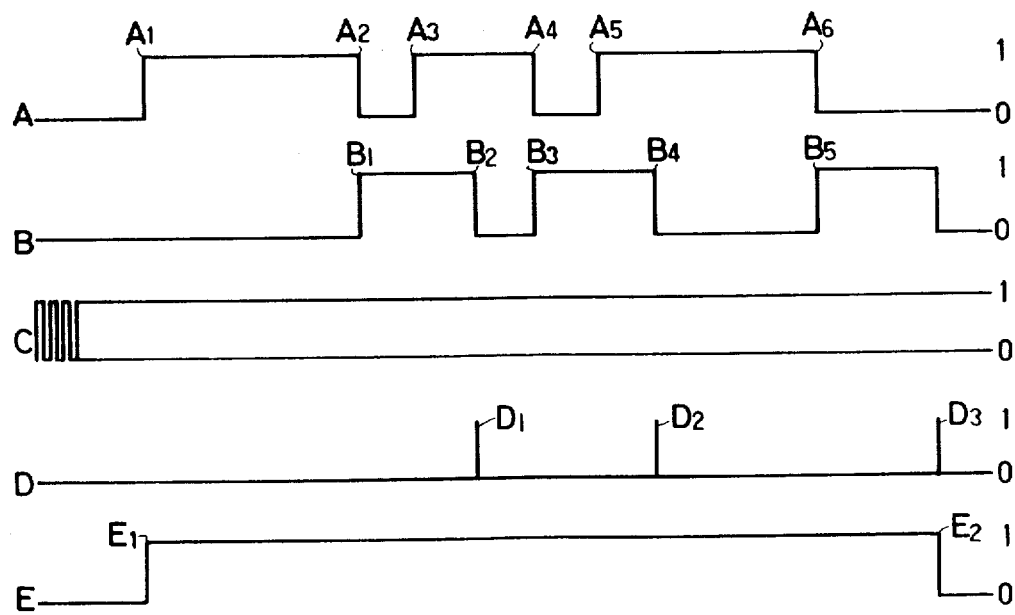
FIG. 7 is a chart showing the logic signals generated in part of the logic circuit shown in FIG. 6.

Let us now refer to FIG. 7 in which the wave forms generated by the above described circuitry are shown. The letter A denotes the logic signal appearing on the output of the comparator 13. The letter B denotes the wave form appearing on the output of the flip-flop circuit 21, the letter C denotes the train of pulses generated by the pulse generator 24, the letter D the signal generated by the digital counter 23 which is used to reset the flip-flop circuit 21 and the letter E denotes the signal appearing on the output of the OR gate 16.

Operation wise the above described circuitry is similar to that of the first embodiment; the flip-flop circuit is set by a signal (not shown) from the differentiating circuit 20 when the logic 1 signal disappears from the output of the comparator 13 i.e. at a point $A_2$ and remains in that state until a point $B_2$ at which time an impulse $D_1$ resets the flip-flop 21. The procedure is repeated at a point $A_4$ when the danger signal disappears and the flip-flop is set again, i.e. at point $B_3$. Once again the counter 23 counts through half a cycle and generates an impulse $D_2$ to again reset the flip-flop 21. Thus as shown the OR gate continuously exhibits a logic 1 signal on its output thereby maintaining smooth jolt free braking as compared with the prior art.

Thus by way of example if the vehicle equipped with the invention (i.e. the second embodiment) is traversing a road at a speed of 60 km/hr and if the pulse generator is set to generate pulses at a rate of 637 cps, and the digital counter is a 9 bit binary counter in which one cycle is 512 pulses (half a cycle is 256 pulses) the vehicle will be braked for a distance of approximately 6.7 M each time the flip-flop 21 is reset.

FIG. 8 is a flow chart showing the logic followed by the logic circuitry of the invention. As shown at stage 1 of the program the signals from the radar are compared. If the equations are satisfied (i.e. YES) then the program goes to stage 2 (i.e. a danger or logic 1 signal appears on the output of the comparator 13) and the braking system of the vehicle is activated. The program returns to START, until the equations at stage 2 are not satisfied (i.e. NO, or when a safe or logic 0 signal appears on the output of the comparator 13) whereupon the program goes to stage 3. At stage 3 it is determined if the brake system had just been activated or not. If NO (i.e. the braking system had not just been activated) the program returns to START. If YES the program proceeds to stage 4 where at the braking system is further activated for a period of time. There are preferably at least three possible periods, i.e. $t_1$, $t_2$ or $t_3$, where $t_1$ is a pre-selected time (only), $t_2$ is a function of a predetermined distance D and the actual velocity of the vehicle Va and $t_3$ is a function of the pre-selected distance D and the relative velocity dR/dt just prior the danger signal disappearing, for which the additional braking will take place. On completion of this additional braking the program goes to stage 6 where the brake is released and then to the final stage or END.

The invention as presented can be the addition of rather elementary circuitry provide greatly improved characteristics and increased safety as compared with the prior art.

Although only two embodiments have been set forth in the foregoing it will be understood that the invention is not so limited and many variations are possible without deviating from the spirit and scope of same.

What is claimed is:

1. In an automatic braking system for a motor vehicle having a brake for braking the vehicle which is applicable by the automatic braking system;

an antenna for transmitting and receiving a radar signal;

a radar operatively connected to the antenna;

a comparator a first input of which is connected to a first output of the radar to receive a first signal therefrom;

a square law demodulator the input of which is connected to the second output of the radar to receive a second signal therefrom;

a digital potentiometer connected to the square law demodulator to receive a third signal therefrom and arranged to increase the magnitude of the third signal by a coefficient to form a fourth signal, the output of the digital potentiometer being connected to a second input of the comparator to feed the fourth signal thereto, the comparator being arranged to compare the first and fourth signals and generate first and second logic signals;

a brake actuator driving circuit which is arranged to produce a drive signal in response to the first logic signal; and a brake actuator connected to the brake actuator driving circuit to apply the brake of the vehicle when receiving the drive signal; the improvement comprising means connected between the output of the comparator and the input of the brake actuator driving circuit which adds the first logic signal to the input of the brake actuator driving circuit for a time after the first logic signal has disappeared from the output of the comparator.

2. An automatic braking system as claimed in claim 1, wherein said means comprises:

a monostable multivibrator, the input of which is connected to the output of said comparator and which is arranged to enter a quasi stable state for a period of time when a first logic signal disappears from the output of the comparator and to generate a first logic signal on its output while it is in the quasi stable state; and an OR gate the first input of which is connected to the output of the comparator, the second input of which is connected to the output of the monostable multivibrator and the output of which is connected to the input of said brake actuator driving circuit.

3. An automatic braking system for a motor vehicle as claimed in claim 1 wherein said means comprises:

a differentiating circuit the input of which is connected to the output of said comparator and which is arranged to generate a set signal when the first logic signal disappears from the output of the comparator and the second logic signal appears on same;

a first means the first input of which is connected to the output of the differentiating circuit for receiving the set signal therefrom and which is arranged so that a first logic signal appears on its output when the set signal is received from the differentiating circuit;

a timing circuit the input of which is connected to the output of the first means and the output of which is connected to a second input of the first means, the timing circuit being arranged to generate a reset signal, which when received by the first means cause a second logic signal to appear on the output of the first means, for a predetermined time after being triggered by the presence of a first logic signal on the output of the first means, the predetermined time being variable with respect to the wheel speed of the vehicle in which the automatic braking system is mounted; and an OR gate the first input of which is connected to the output of the comparator the second input of which is connected to the output of the first means and the output of which is connected to said brake actuator driving circuit.

4. An automatic braking system for a motor vehicle as claimed in claim 1 wherein said means comprises;

a differentiating circuit, the input of which is connected to the output of the comparator;

a flip-flop circuit the set input of which is connected to the output of the differentiating circuit;

an OR gate one input of which is connected to the output of the comparator and the other input of which is connected to the output of the flip-flop circuit;

an AND gate one input of which is connected to the output of the flip-flop;

a digital counter the input of which is connected to the output of the AND gate and the input of which is connected to the reset input of the flip-flop circuit; and a pulse generator connected to the other input of the AND gate, the pulse counter being arranged to generate a train of pulses proportional to the wheel speed of the vehicle in which the automatic braking system is mounted.

5. An automatic braking system for a motor vehicle as claimed in claim 4 wherein said digital counter is a nine bit binary counter which is arranged to generate the said reset signal after counting through half a normal cycle.

* * * * *